(12) United States Patent
Teasley

(10) Patent No.: US 9,388,526 B2
(45) Date of Patent: Jul. 12, 2016

(54) GRAFTED PARA-ARAMID FIBER AND METHOD OF MAKING

(71) Applicant: Mark F Teasley, Landenberg, PA (US)

(72) Inventor: Mark F Teasley, Landenberg, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 351 days.

(21) Appl. No.: 14/155,456

(22) Filed: Jan. 15, 2014

(65) Prior Publication Data

US 2015/0197886 A1   Jul. 16, 2015

(51) Int. Cl.
| | |
|---|---|
| *D06M 14/00* | (2006.01) |
| *D06M 14/16* | (2006.01) |
| *D06M 15/356* | (2006.01) |
| *B60C 9/00* | (2006.01) |
| *C08J 5/04* | (2006.01) |
| *C08J 5/06* | (2006.01) |
| *D06M 13/44* | (2006.01) |
| *D06M 14/34* | (2006.01) |
| *D06M 101/36* | (2006.01) |

(52) U.S. Cl.
CPC ............. *D06M 14/16* (2013.01); *B60C 9/0042* (2013.04); *C08J 5/046* (2013.01); *C08J 5/06* (2013.01); *D06M 13/44* (2013.01); *D06M 14/34* (2013.01); *D06M 15/3562* (2013.01); *D06M 2101/36* (2013.01); *Y10T 428/2969* (2015.01); *Y10T 442/60* (2015.04)

(58) Field of Classification Search
CPC . D06M 14/16; D06M 15/3562; D06M 13/44; D06M 13/34; D06M 2101/36; C08J 5/046; C08J 5/06; B60C 9/0042; Y10T 442/60; Y10T 428/2969

See application file for complete search history.

(56) References Cited

U.S. PATENT DOCUMENTS

| | | | |
|---|---|---|---|
| 3,094,511 A | 6/1963 | DuPont | |
| 3,354,127 A | 11/1967 | DuPont | |
| 3,673,143 A | 6/1972 | Bair et al. | |
| 3,767,756 A | 10/1973 | Blades | |
| 3,819,587 A | 6/1974 | Kwoleck | |
| 3,869,429 A | 3/1975 | Blades | |
| 3,869,430 A | 3/1975 | Blades | |
| 4,172,938 A | 10/1979 | Mera et al. | |
| 6,045,907 A | 4/2000 | Rebouillat | |
| 6,358,451 B1 | 3/2002 | Rebouillat | |
| 2015/0197876 A1* | 7/2015 | Teasley | ................... D01F 6/805 442/327 |

OTHER PUBLICATIONS

U.S. Appl. No. 13/551,674, filed Jul. 8, 2012, DuPont.

* cited by examiner

*Primary Examiner* — Nathan M Nutter

(57) ABSTRACT

A method of making a fiber comprised of poly(p-phenylene terephthalamide) having monomer groups grafted onto the fiber surface, the method comprising the steps of (i) providing a fiber of poly(p-phenylene terephthalamide) that has been dried to remove adsorbed moisture, (ii) treating the fiber, in a non-polar solvent that will not dissolve the fiber, with a phosphazene base that exhibits a pKa in dimethylsulfoxide of at least 21 so as to generate anions at the amide sites on the surface of the poly(p-phenylene terephthalamide) fiber, (iii) washing the base-activated fiber with an aprotic solvent, (iv) grafting a monomer onto the anion sites so as to introduce reactive functional groups onto the surface of the poly(p-phenylene terephthalamide) fiber, and (v) washing the grafted fiber of step (iv) with a protic solvent to extract any residual base compounds and grafting agents that are unbound to the surface of the fibers.

14 Claims, No Drawings

GRAFTED PARA-ARAMID FIBER AND METHOD OF MAKING

BACKGROUND

1. Field of the Invention

This invention pertains to the field of grafted aromatic polyamide or copolyamide fibers.

2. Description of Related Art

U.S. Pat. Nos. 6,045,907 and 6,358,451 to Rebouillat disclose poly(p-phenylene terephthalamide) fibers that have been grafted with nitrobenzyl, allyl, or nitrostilbene groups to increase adhesion of the fibers to rubber. A process for making the grafted fibers that requires wet or never-dried as-spun para-aramid fibers to prepare the base-activated fibers for the grafting step is also disclosed. References are cited therein that disclose alternative processes for preparing grafted fibers to improve their adhesion with a variety of polymeric matrices.

There is an ongoing need to provide para-aramid type fibers that have enhanced adhesion for reinforcement of polymeric matrices.

SUMMARY OF THE INVENTION

This invention pertains to a method of making a fiber comprised of poly(p-phenylene terephthalamide) having monomer groups grafted onto the fiber surface, the method comprising the steps of:

(i) providing a fiber of poly(p-phenylene terephthalamide) that has been dried to remove adsorbed moisture, (ii) treating the fiber, in a non-polar solvent that will not dissolve the fiber, with a phosphazene base that exhibits a pKa in dimethylsulfoxide of at least 21 so as to generate anions at the amide sites on the surface of the poly(p-phenylene terephthalamide) fiber, and (iii) grafting a monomer onto the anion sites so as to introduce reactive functional groups onto the surface of the poly (p-phenylene terephthalamide) fiber.

Further embodiments involving additional method steps are also described.

DETAILED DESCRIPTION

Fiber

The fiber is an aromatic polyamide or copolyamide fiber. A preferred aromatic polyamide is para-aramid by virtue of having exceptional tensile strength and modulus. As used herein, the term para-aramid filaments means filaments made of para-aramid polymer. The term aramid means a polyamide wherein at least 85% of the amide (—CONH—) linkages are attached directly to two aromatic rings. Suitable para-aramid fibers and their properties are described in Man-Made Fibres—Science and Technology, Volume 2, in the section titled Fibre-Forming Aromatic Polyamides, page 297, W. Black et al., Interscience Publishers, 1968. Aramid fibers and their production are, also, disclosed in U.S. Pat. Nos. 3,767, 756; 4,172,938; 3,869,429; 3,869,430; 3,819,587; 3,673,143; 3,354,127; and 3,094,511.

A preferred para-aramid is poly(p-phenylene terephthalamide), which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups that interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether. Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride of the aramid.

Another suitable fiber is one based on aromatic copolyamide such as is prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl)benzimidazole with terephthalic acid or anhydrides or acid chloride derivatives of these monomers.

In some embodiments, the fiber is in the form of a continuous filament. For purposes herein, the term "filament" is defined as a relatively flexible, macroscopically homogeneous body having a high ratio of length to width across its cross-sectional area perpendicular to its length. The filament cross section can be any shape, but is typically round or bean shaped. Multifilament yarn spun onto a bobbin in a package contains a plurality of continuous filaments. In the context of this disclosure, the terms filament and fiber may be used interchangeably.

In some other embodiments, the fiber is in the form of a pulp. Pulp is a fibrillated fiber product that is manufactured from yarn by chopping into staple then mechanically abrading in water to partially shatter the fibers. This leads to a large increase in surface area as fibrils with diameters as low as 0.1 µm are attached to the surface of the main fibers, which are typically 12 µm in diameter. Such pulps must be kept moist to prevent the fibrillar morphology from collapsing if they are to be highly dispersible in different matrices. The pulps are used as fillers in elastomer compounds to modify their tensile properties. The largest application is in natural rubber for mechanical rubber goods such as in tire reinforcement. The moist pulps are dispersed into water and mixed with elastomer latexes then coagulated to give concentrated masterbatches. An exemplary masterbatch is known as Kevlar® Engineered Elastomer (EE) available from E.I. DuPont de Nemours and Company, Wilmington, Del. The EE masterbatches contain the pulp in a highly dispersed state that can be compounded into bulk elastomer to give the desired level of pulp modification.

Other suitable forms of fibrous material are a staple spun yarn, a nonwoven fabric, floc or chopped yarn strand. A plurality of filaments or yarns may be combined to form a cord. These terms are well known in the textile fibers art.

Grafting onto Fiber

The para-aramid fibers described above have amide linkages exposed on the fiber surface that can be used as reaction sites for grafting of monomers. Such grafting reactions in the prior art have required the combination of dipolar aprotic solvents, particularly dimethylsulfoxide, with strong bases, such as potassium tert-butoxide and sodium hydride, to generate anions at the amide sites. However, these conditions are also capable of dissolving the resulting anionic aramid polymer off of the fiber surface and degrading the fiber properties in an undesirable manner. The methods disclosed herein avoid these problems and can cleanly graft a wide variety of monomers onto the fiber surface. The monomers are chosen to improve adhesion of the grafted fibers with a variety polymeric matrices and thereby enhance the reinforcement of their fiber-reinforced articles. Suitable monomers are an allyl halide, a substituted benzyl chloride, a substituted N-phenylmaleimide or a substituted epoxy. Preferably, such monomers will contain at least two reactive functional groups, the first being capable of undergoing the grafting reaction and the second being capable of reacting with the polymeric matrix. The base monomer group typically undergoes the grafting reaction while the substituted group preferably is a functional group that is capable of reacting with the polymeric matrix, such as an allyl, vinyl, or epoxy group. More specifically, the substituted benzyl chloride is 4-vinylbenzyl chloride or 3-vinylbenzyl chloride, the substituted N-phenymaleimide is N-(4-vinylphenyl)maleimide, and the substituted epoxy is 4,4'-methylene-bis(N,N-diglycidylaniline), epichlorohydrin, or epibromohydrin.

The majority of these monomers graft as a single monomeric group onto the amide sites on the fiber surface, which limits the achievable graft level in terms of weight-precent grafted monomer. An exception to this trend is the substituted N-phenymaleimide monomers, which undergo a graft polymerization reaction of the maleimide groups that is intiated by the anionic amide site on the fiber surface. The principles of anionic polymerization of N-substituted maleimide monomers are discussed in an article by T. Hagiwara et al., Macromolecules, volume 24, pages 6856-6858 (1991). In particular, substituted N-phenylmaleimide monomers are preferred because their polymerizations exhibit "living" characteristics for better control of polymer molecular weight and structure. Graft polymerization of a substituted N-phenylmaleimide monomer leads to higher weight-percent graft levels than is possible with the grafting of monomeric groups. If the substituted N-phenylmaleimide monomer is N-(4-vinylphenyl)maleimide, graft polymerization leads to more than one vinyl group being grafted to the fiber surface thereby increasing the potential for enhanced adhesion between the grafted fiber and a polymeric matrix.

In some embodiments, the grafted fiber comprises poly(p-phenylene terephthalamide) having N-(4-vinylphenyl)maleimide groups grafted onto the fiber surface. Preferably, the N-(4-vinylphenyl)maleimide groups comprise 0.1 to 10 weight % of the total weight of the fiber. More preferably, the N-(4-vinylphenyl)maleimide groups comprise 1 to 10 weight of the total weight of the fiber.

In some embodiments, the hydrogen on 0.25 to 75 mole percent of the amide sites of the poly(p-phenylene terephthalamide) on the fiber surface have been replaced by grafting N-(4-vinylphenyl)maleimide groups. More preferably, the hydrogen on 10 to 50 mole percent of the amide sites on the fiber surface has been replaced by grafting N-(4-vinylphenyl)maleimide groups.

Method of Making Grafted Fiber

A method of making a fiber comprised of poly(p-phenylene terephthalamide) having monomer groups grafted onto the fiber surface, the method comprising the steps of:
(i) providing a fiber of poly(p-phenylene terephthalamide) that has been dried to remove adsorbed moisture,
(ii) treating the fiber, in a non-polar solvent that will not dissolve the fiber, with a phosphazene base that exhibits a pKa in dimethylsulfoxide of at least 21 so as to generate anions at the amide sites on the surface of the poly(p-phenylene terephthalamide) fiber, and
(iii) grafting a monomer onto the anion sites so as to introduce reactive functional groups onto the surface of the poly(p-phenylene terephthalamide) fiber.

Further optional steps such as washing and drying the grafted fiber may be carried out. This method of using a combination of a non-polar solvent with a phosphazene base to generate the anionic amide sites is effective at grafting the monomers to the fiber surface without degrading the exceptional physical properties of para-aramid fibers.

In a preferred embodiment, the phosphazene base exhibits a pKa in dimethylsulfoxide of at least 30. Suitable non-polar solvents are aprotic and include linear or alicyclic hydrocarbons, aromatic hydrocarbons, or ethers. Preferably, the non-polar solvent is toluene or tetrahydrofuran. Preferably, the phosphazene base is an iminophosphorane, phosphazophosphazene, aminophosphazene, guanidinophosphazene, or phosphatrane. Examples of such phosphazene bases and their chemical properties are described by Kolomeitsev et al. in the Journal of the American Chemical Society, volume 127, pages 17656-17666 (2005). Such phosphazene bases display high basicity even in non-polar solvents and low nucleophilicity compared to typical strong bases used in the prior art on para-aramid fibers. More preferably, the phosphazene base is the tertiary-butyl-$P_4$-phosphazene. Preferably the grafting base solution has a grafting agent concentration of 0.0005 to 6 molar. A suitable monomer is an allyl halide, a substituted benzyl chloride, a substituted N-phenylmaleimide or a substituted epoxy. Preferably, wherein the substituted benzyl chloride is 4-vinylbenzyl chloride or 3-vinylbenzyl chloride, the substituted N-phenymaleimide is N-(4-vinylphenyl)maleimide, and the substituted epoxy is 4,4'-methylene-bis(N,N-diglycidylaniline), epichlorohydrin, or epibromohydrin.

In a further embodiment, a method of making a fiber comprised of poly(p-phenylene terephthalamide) having monomer groups grafted onto the fiber surface, the method comprising the steps of:
(i) providing a fiber of poly(p-phenylene terephthalamide) that has been dried to remove adsorbed moisture,
(ii) treating the fiber, in a non-polar solvent that will not dissolve the fiber, with a phosphazene base that exhibits a pKa in dimethylsulfoxide of at least 21 so as to generate anions at the amide sites on the surface of the poly(p-phenylene terephthalamide) fiber,
(iii) grafting a monomer onto the anion sites so as to introduce reactive functional groups onto the surface of the poly(p-phenylene terephthalamide) fiber, and
(iv) washing the grafted fiber of step (iii) with a protic solvent to extract any residual base compounds and grafting agents that are unbound to the surface of the fibers.

In yet another embodiment, a method of making a fiber comprised of poly(p-phenylene terephthalamide) having monomer groups grafted onto the fiber surface, the method comprising the steps of:
(i) providing a fiber of poly(p-phenylene terephthalamide) that has been dried to remove adsorbed moisture,
(ii) treating the fiber, in a non-polar solvent that will not dissolve the fiber, with a phosphazene base that exhibits a pKa in dimethylsulfoxide of at least 21 so as to generate anions at the amide sites on the surface of the poly(p-phenylene terephthalamide) fiber,
(iii) washing the base-activated fiber with a non-polar solvent to eliminate excess base compounds, (iv) grafting a monomer onto the anion sites so as to introduce reactive functional groups onto the surface of the poly(p-phenylene terephthalamide) fiber, and (v) washing the grafted fiber of step (iv) with a protic solvent to extract any residual base compounds and grafting agents that are unbound to the surface of the fibers.

Suitable protic solvents for washing of the grafted fiber include alcohols, glycols, carboxylic acids, water, and their mixtures. Preferably, the protic solvent is methanol or water.

Embodiments similar to those described above are applicable to fiber in the form of filament, continuous filament yarn, cord, spun staple yarn, nonwoven fabric, floc, pulp or chopped strand. Whereas pulps are typically kept moist, they must be carefully dried for the grafting methods described above to preserve their ability to be highly dispersible in different polymeric matrices and concentrated masterbatches. The preferred method for the drying of moist or even highly hydrated pulps is to freeze-dry them as disclosed in U.S. patent application Ser. No. 13/551,674 filed Jul. 18, 2012.

Composite

Fibers comprising poly(p-phenylene terephthalamide) having monomers such as N-(4-vinylphenyl)maleimide groups grafted onto the fiber surface may be combined with a matrix resin to form a fiber-reinforced resin composite. Suitable fiber forms include a continuous filament yarn, spun staple yarn, nonwoven fabric, pulp or chopped strand. The resin may be a thermoset or thermoplastic resin. Typically the matrix resin comprises from 30 to 50 weight percent of the weight of fiber plus resin in the composite. Suitable thermoset resins include epoxy, phenolic, epoxy-novolac, cyanate ester, unsaturated ester, melamine and maleimide. The fibers may be treated by any of the methods described above. In a similar way, monomers other than N-(4-vinylphenyl)maleimide may be grafted onto the surface of poly(p-phenylene terephthalamide) fiber prior to combining the fiber with a matrix resin to form a fiber-reinforced resin composite. Other suitable momoners include an allyl halide, a substituted benzyl chloride, a substituted N-phenylmaleimide or a substituted epoxy that are grafted to the fiber using the methods described herein. Preferably, wherein the substituted benzyl chloride is 4-vinylbenzyl chloride or 3-vinylbenzyl chloride, the substituted N-phenymaleimide is N-(4-vinylphenyl)maleimide, and the substituted epoxy is 4,4'-methylene-bis(N,N-diglycidylaniline), epichlorohydrin, or epibromohydrin.

Mechanical Rubber Goods

Fibers comprising poly(p-phenylene terephthalamide) having monomers such as N-(4-vinylphenyl)maleimide groups grafted onto the fiber surface may be combined with an elastomer to form a fiber-reinforced rubber article. Suitable fiber forms include a continuous filament yarn, spun staple yarn, nonwoven fabric, pulp or chopped strand. Suitable elastomers include both natural rubber, synthetic natural rubber and synthetic rubber. Synthetic rubber compounds can be any that are dissolved by common organic solvents and can include, among many others, polychloroprene and sulfur-modified chloroprene, hydrocarbon rubbers, butadiene-acrylonitrile copolymers, styrene butadiene rubbers, chlorosulfonated polyethylene, fluoroelastomers, polybutadiene rubbers, polyisoprene rubbers, butyl and halobutyl rubbers and the like. Natural rubber, styrene butadiene rubber, polyisoprene rubber and polybutadiene rubber are preferred. Mixtures of rubbers may also be utilized. In one embodiment, a dipped cord suitable for use in a rubber compound comprises fiber comprising poly(p-phenylene terephthalamide) having monomers such as N-(4-vinylphenyl)maleimide groups grafted onto the fiber surface coated with a styrene-butadiene-vinylpyridine rubber latex. Carbon black and silica may optionally be present in the styrene-butadiene-vinylpyridine rubber latex used to coat the grafted cord. The fibers may be treated by any of the methods described above. In a similar way, monomers other than N-(4-vinylphenyl)maleimide may be grafted onto the surface of poly(p-phenylene terephthalamide) fiber prior to combining the fiber with an elastomer to form a fiber-reinforced elastomeric compound. Other suitable monomers include an allyl halide, a substituted benzyl chloride, a substituted N-phenylmaleimide or a substituted epoxy that are grafted to the fiber using the methods described herein. Preferably, wherein the substituted benzyl chloride is 4-vinylbenzyl chloride or 3-vinylbenzyl chloride, the substituted N-phenymaleimide is N-(4-vinylphenyl)maleimide, and the substituted epoxy is 4,4'-methylene-bis(N,N-diglycidylaniline), epichlorohydrin, or epibromohydrin.

TEST METHODS

The H-pull adhesion measurements were performed according to ASTM D4776-10 using an extensometer. The H-pull samples were molded using a standard rubber stock as described by Y. Iyengar, *J. Appl. Polym. Sci.*, 1978, 22, 801-812. The adhesion values are reported in units of pounds-force (lbf) as the average of at least five samples.

The specific surface areas were measured by nitrogen adsorption/desorption at liquid nitrogen temperature (77.3 K) using a Micromeritics ASAP 2405 porosimeter. Samples were out-gassed overnight at a temperature of 150° C., unless noted otherwise, prior to the measurements and the weight losses were determined due to adsorbed moisture. A five-point nitrogen adsorption isotherm was collected over a range of relative pressures, $P/P_0$, from 0.05 to 0.20 and analyzed according to the BET method (S. Brunauer, P. H. Emmett, and E. Teller, *J. Am. Chem. Soc.* 1938, 60, 309); P is the equilibrium gas pressure above the sample, $P_0$ is the saturation gas pressure of the sample, typically greater than 760 Torr.

The tensile stress-strain measurements were performed according to ASTM D412-06a, method A, using an extensometer. Dumbell tensile bars were cut using Die C as described in Method A. The tensile results are reported as the average of six samples.

EXAMPLES

Abbreviations used in the examples and tables are as follows: mL (milliliter), mmole (millimole), wt (weight), THF (tetrahydrofuran), ECP (epichlorohydrin), VBC (4-vinylbenzyl chloride), VPM (N-(4-vinylphenyl)maleimide), MBDGA (4,4'-methylene bis(N,N-diglycidylaniline)), AS (4-aminostyrene), EMI-24 (2-ethyl-4-methylimidazole), TGA (thermal gravimetric analysis), ATR IR (attenuated total reflectance infrared spectroscopy), VPL (vinylpyridine latex), RFL (resorcinol-formaldehyde-vinylpyridine latex), BET (Brunauer-Emmett-Teller specific surface area), T (temperature), MD (machine direction), XD (cross-machine direction), phr (parts per hundred rubber).

Unless noted, the examples were prepared using materials supplied by the Aldrich Chemical Company, Milwaukee, Wis., including $P_1tBu$ phosphazene, $P_1tBu[(CH_2)_4]_3$ phosphazene, $P_2tBu$ phosphazene in THF solution (2M), $P_4tBu$ phosphazene in hexane solution (1M), and 4-vinylbenzyl chloride (90% technical grade); GenTac® FS vinylpyridine latex (vinylpyridine-butadiene-styrene terpolymer emulsion, 41% total solids in water), Omnova Solutions Inc.; Alcogum® 6940 thickener (polyacrylic acid, sodium salt;

11% solids) and Alcogum® SL 70 dispersing agent (acrylate copolymer; 30% solids), Akzo Nobel Surface Chemistry, Chattanooga, Tenn.; Aquamix™ 125 (Wingstay® L, hindered polymeric phenolic antioxidant, 50% solids) and Aquamix™ 549 (zinc 2-mercaptotoluimidazole, 50% solids) dispersions, PolyOne Corp., Massillon, Ohio; Amax® OBTS accelerator (N-oxydiethylene-2-benzothiazole-sulfenamide) and AgeRite® Resin D antioxidant (polymerized 1,2-dihydro-2,2,4-trimethylquinoline), R. T. Vanderbilt Co., Norwalk, Conn.; DPG accelerator (diphenyl guanidine), Akrochem Corp., Akron, Ohio; Santoflex® 6PPD antiozonant (N-(1,3-dimethylbutyl)-N'-phenyl-para-phenylenediamine), Solutia/Flexsys® America, Akron, Ohio. N-(4-vinylphenyl)maleimide was supplied by Acros Organics or prepared according to T. Hagiwara et al., Macromolecules, volume 24, pages 6856-6858 (1991). Kevlar® 29 cord (finish-free, 2 plies of 1500 denier yarn), RFL-coated Kevlar® 29 cord, and Kevlar® pulp 1F361 (BET 7-9 $m^2/g$) were obtained from E. I. Du Pont de Nemours and Company, Wilmington, Del. The reactions were run under nitrogen using glassware dried at 120° C.

The following examples are given to illustrate the invention and should not be interpreted as limiting it in any way. All parts and percentages are by weight unless otherwise indicated. Examples prepared according to the process or processes of the current invention are indicated by numerical values. Control or Comparative Examples are indicated by letters. Data and test results relating to the Comparative and Inventive Examples are summarized in Tables 1 to 6.

Example 1

Kevlar® 29 cord was cut into 1.5 inch lengths that were placed individually into glass vials and dried overnight at 80° C. under vacuum. The vials were transferred to a nitrogen-purged glove box. The cord samples were covered with a variety of anhydrous solvents (5 mL) and treated with various phosphazene bases (10 drops) while examining for any visual changes. The cords were then allowed to sit overnight. Table 1 summarizes the observed visual changes along with the pK values reported in the literature for the phosphazene bases. These results show that the $P_4tBu$ phosphazene has high enough pK values to generate the polyanion on the fiber surface without dissolving it in a non-polar solvent like toluene or THF. $P_2tBu$ phosphazene has high enough pK values to generate the polyanion and dissolve it in DMSO.

TABLE 1

| Phosphazene | $P_1tBu$ | $P_1tBu[(CH_2)_4]_3$ | $P_2tBu$/THF | $P_4tBu$/Hexane |
|---|---|---|---|---|
| $pK_{BH}+$ (CH$_3$CN) | 26.9 | 28.4 | 33.5 | 41.9 |
| $pK_a$ (DMSO) | ~15 | ~16 | 21 | 30 |
| Hexane | none | none | none | darker yellow cord, clear solution |
| Cyclohexane | none | none | none | darker yellow cord, clear solution |
| Toluene | none | none | none | orange cord, clear solution |
| THF | none | none | yellow cord, light violet solution | dark orange cord, faint yellow solution |
| Pyridine | none | none | yellow cord, off-colored solution | orange cord, red-orange solution |
| Acetonitrile | none | none | yellow cord, yellow solution | yellow cord and solution |
| DMSO | none | none | dissolved | yellow-orange cord, thick orange solution |

TABLE 1-continued

| Phosphazene | $P_1tBu$ | $P_1tBu[(CH_2)_4]_3$ | $P_2tBu$/THF | $P_4tBu$/Hexane |
|---|---|---|---|---|
| | | | | cord and solution |

Example 2

Kevlar® 29 cord (3 meters) was wound onto a glass stirring rod and secured using Teflon® tape; the cord weighed about 1 g (8.4 mmole amide groups). The assembly was dried at 120° C. under vacuum. Inside the glove box, a solution of $P_4tBu$ phosphazene (0.82 mL, 0.82 mmole, 9.8 mole %) in anhydrous toluene (100 mL) was prepared in a 200 mL tube equipped with a Teflon® stirring bar, two-way adapter, gas-tight Teflon® stirrer bearing, and gas inlet. The cord was immersed in the phosphazene solution to give an immediate color change and heated to 30° C. After 45 minutes, the cord was rust-orange in color and the solution was colorless. After 2 hours, there was essentially no change, so the cord was transferred to a solution of epichlorohydrin (0.66 mL, 8.4 mmole, 100 mole %) in anhydrous toluene (100 mL) in a 200 mL tube while keeping blanketed under nitrogen. After 1 hour at 25° C., the orange color had faded some, and after stirring overnight, the color had faded almost completely back to yellow. The cord was washed by soaking several times in fresh toluene. Samples of the cord were dried under vacuum for analysis. TGA showed a weight loss of 1.6 wt % between 200 and 400° C. due to the grafted groups. ATR IR showed increased absorbances at 2800-3000 $cm^{-1}$ for C—H bonds relative to untreated cord. The H-pull adhesion was 6.8 lbf relative to 5.2 lbf for untreated cord.

Example 3

The procedure of Example 2 was repeated using less $P_4tBu$ phosphazene (0.21 mL, 2.5 mole %) and 4-vinylbenzyl chloride (0.14 g, 0.84 mmole, 10 mole %) for the grafting reaction. After 20 minutes of grafting, the rust-orange color had faded to yellow and after 1 hour to light yellow. After stirring overnight, the cord was worked up and analyzed as before. TGA showed a weight loss of 0.7 wt % between 200 and 400° C. due to the grafted 4-vinylbenzyl groups. The H-pull adhesion was 9.6 lbf.

Example 4

The procedure of Example 3 was repeated using more $P_4tBu$ phosphazene (0.42 mL, 5 mole %) and 4-vinylbenzyl chloride (1.1 g, 7 mmole, 83 mole %). After 5 minutes of grafting, the color had faded to yellow-orange and after 2 hours to light yellow. After stirring overnight, the cord was quenched by soaking in methanol and washed twice each with methanol and toluene. TGA showed a weight loss of 0.1 wt % between 200 and 400° C. due to the grafted 4-vinylbenzyl groups. The H-pull adhesion was 10.6 lbf.

Example 5

The procedure of Example 4 was repeated using more $P_4tBu$ phosphazene (0.84 mL, 10 mole %) and anhydrous THF as the solvent. After 5 minutes of grafting, the color had faded to yellow-orange and after overnight to light yellow.

TGA showed a weight loss of 0.9 wt % between 150 and 400° C. due to the grafted 4-vinylbenzyl groups. The H-pull adhesion was 10.1 lbf.

Example 6

The procedure of Example 5 was repeated using 4,4'-methylene bis(N,N-diglycidylaniline) (3 g, 7 mmole) for the grafting reaction. After 30 minutes of grafting, the color had faded slightly and after overnight to yellow-orange. TGA showed a weight loss of 1.8 wt % between 200 and 400° C. due to the grafted epoxy groups. ATR IR showed increased absorbances at 3500 cm$^{-1}$ for hydroxyl groups, 2800-3000 cm$^{-1}$ for C—H bonds, and 1510 cm$^{-1}$ for aromatic groups relative to untreated cord. The H-pull adhesion was 7.2 lbf.

Example 7

Kevlar® 29 cord (3 meters) was wound onto a glass stirring rod and secured using Teflon® tape; the cord weighed about 1 g (8.4 mmole amide groups). The assembly was dried at 120° C. under vacuum then transferred to the glove box. Inside the glove box, a solution of $P_4$tBu phosphazene (1.7 mL, 1.7 mmole, 20 mole %) in anhydrous THF (100 mL) was prepared in a 200 mL tube equipped with a Teflon® stirring bar, two-way adapter, Teflon® stirrer adapter, and gas inlet. The cord was immersed in the phosphazene solution to give an immediate color change. After 15 minutes at room temperature, the cord was rust-orange in color and the solution was clear. After about 2 hours, VBC (1.0 mL, 7 mmole) was added directly to the tube containing the cord immersed in the phosphazene solution. The color quickly faded to orange, and after stirring overnight, the color had faded to yellow. The cord was quenched and washed by soaking twice each in methanol and THF then stored under toluene. Samples of the cord were dried under vacuum for analysis. TGA showed a weight loss of 1.2 wt % between 270 and 470° C. due to the grafted 4-vinylbenzyl groups. ATR IR showed increased absorbances at 2800-3000 cm$^{-1}$ for C—H bonds and 1510 cm$^{-1}$ for aromatic groups relative to untreated cord. The H-pull adhesion was 10.8 lbf.

Example 8

The procedure of Example 7 was repeated using VBC that had been vacuum distilled at 65-70° C. and 1 Torr. TGA showed a weight loss of 2.2 wt % between 150 and 400° C. due to the grafted 4-vinylbenzyl groups. The H-pull adhesion was 11.7 lbf.

Example 9

The procedure of Example 8 was repeated, except that the phosphazene-treated cord was transferred to a fresh solution of VBC in THF (100 mL). TGA showed a weight loss of 0.5 wt % between 170 and 400° C. due to the grafted 4-vinylbenzyl groups. ATR IR showed increased absorbances at 1510 cm$^{-1}$ for aromatic groups relative to untreated cord. The H-pull adhesion was 9.8 lbf.

Example 10

The procedure of Example 8 was repeated using less $P_4$tBu phosphazene (0.8 mL, 10 mole %). TGA showed a weight loss of 0.3 wt % between 200 and 400° C. due to the grafted 4-vinylbenzyl groups. The H-pull adhesion was 10.7 lbf.

Example 11

The procedure of Example 9 was repeated using less $P_4$tBu phosphazene (0.8 mL, 10 mole %) and N-(4-vinylphenyl) maleimide (1 g, 5 mmole, 60 mole %) for the grafting reaction. After the overnight grafting reaction, the grafted cord was still rust-orange in color. The cord retained some color after quenching and washing in methanol. TGA showed a weight loss of 4.3 wt % between 200 and 520° C. due to the graft polymerization of the maleimide groups. ATR IR showed increased absorbances at 2800-3200 cm$^{-1}$ for C—H bonds, intense absorbances at 1701, 1512, 1392, and 1182 cm$^{-1}$ for the imide and aromatic groups, and absorbances at 987 and 910 cm$^{-1}$ for the vinyl groups relative to untreated cord. The H-pull adhesion was 13.3 lbf.

Example 12

The procedure of Example 11 was repeated using less $P_4$tBu phosphazene (0.4 mL, 5 mole %). After the overnight grafting reaction, the grafted cord was still dark orange in color so the reaction was continued at 40° C. for 2 hours then at 60° C. for 2 hours. The cord retained some color after quenching and washing in methanol. TGA showed a weight loss of 6.3 wt % between 400 and 530° C. due to the graft polymerization of the maleimide groups. ATR IR showed increased absorbances at 2800-3000 cm$^{-1}$ for C—H bonds, intense absorbances at 1701, 1512, 1390, and 1182 cm$^{-1}$ for the imide and aromatic groups, and absorbances at 985 and 910 cm$^{-1}$ for the vinyl groups relative to untreated cord. The H-pull adhesion was 12.9 lbf.

Example 13

The procedure of Example 11 was repeated using 4,4'-methylene bis(N,N-diglycidylaniline) for the grafting reaction. TGA showed a weight loss of 3.4 wt % between 200 and 500° C. due to the graft polymerization of the epoxy groups. ATR IR showed decreased absorbances at 3200 cm$^{-1}$ for amide groups and increased absorbances at 2800-3000 cm$^{-1}$ for C—H bonds and at 1512 cm$^{-1}$ for aromatic groups relative to untreated cord. The H-pull adhesion was 6.6 lbf.

Example 14

The procedure of Example 13 was repeated, except that the $P_4$tBu phosphazene treatment was continued overnight before treating with 4,4'-methylene bis(N,N-diglycidylaniline) for the grafting reaction. TGA showed a weight loss of 6.4 wt % between 200 and 500° C. due to the graft polymerization of the epoxy groups. ATR IR showed decreased absorbances at 3200 cm$^{-1}$ for amide groups and increased absorbances at 3500 cm$^{-1}$ for hydroxyl groups, at 2800-3000 cm$^{-1}$ for C—H bonds, and at 1512 cm$^{-1}$ for aromatic groups relative to untreated cord. The H-pull adhesion was 7.1 lbf.

Comparative Example A

The H-pull adhesion for an untreated sample of Kevlar® 29 cord was 5.2 lbf.

Comparative Example B

The procedure of Example 14 was repeated without using any monomer for the grafting reaction. TGA showed a weight loss of 1.5 wt % between 150 and 400° C. The H-pull adhesion was 5.8 lbf

Comparative Example C

The procedure of Example 7 was repeated using potassium tert-butoxide (0.2 g, 1.8 mmole, 21 mole %) instead of the P$_4$tBu phosphazene and cord was treated overnight before adding the VBC for the grafting reaction. TGA showed a weight loss of 0.4 wt % between 200 and 450° C. The H-pull adhesion was 6.3 lbf.

Comparative Example D

Kevlar® 29 cord (4.5 meters) was wound onto a glass stirring rod and secured using Teflon® tape; the cord weighed about 1.5 g (12.6 mmole amide groups). The assembly was dried at 80° C. under vacuum. A solution of methyl sulfinyl anion in anhydrous DMSO (100 mL) was prepared in a 200 mL tube equipped with a Teflon® stirring bar, two-way adapter, gas-tight Teflon® stirrer bearing, and gas inlet by adding sodium hydride (0.15 g, 6.25 mmole, 50 mole %) to the tube, heating under nitrogen to 70° C. until the solids completely dissolved, and cooling to room temperature. The cord was immersed in the solution to immediately give a slight color change. After 15 minutes, the cord was light yellow-orange in color. After 1 hour, the cord was medium orange in color and the solution was pale yellow. The cord was transferred to a solution of 4-vinylbenzyl chloride (1 mL, 7.1 mmole, 56 mole %) in anhydrous THF (100 mL) in a 200 mL tube while keeping blanketed under nitrogen. After 1 hour at 25° C., the color was unchanged. After 3 hours, there was only a slight fading of the orange color. After stirring overnight, the color had not faded further. The cord was washed by soaking several times in fresh methanol to return it to its original yellow color and stored under toluene. Samples of the cord were dried under vacuum for analysis. TGA showed a weight loss of 1.3 wt % between 300 and 500° C. due to the grafted groups. ATR IR showed increased absorbances at 2800-3200 cm$^{-1}$ for C—H bonds, at 1510 cm$^{-1}$ for aromatic groups, and absorbances at 980 and 910 cm$^{-1}$ for the vinyl groups relative to untreated cord. The H-pull adhesion was 9.0 lbf.

The Inventive Examples 2-14 and Comparative Examples A-D are summarized with their results in Table 2.

TABLE 2

| Example | Solvent | P$_4$tBu mole % | Monomer | mole % | TGA wt % | H-Pull lbf |
|---|---|---|---|---|---|---|
| 2 | toluene | 9.8 | ECP | 100 | 1.6 | 6.8 |
| 3 | toluene | 2.5 | VBC | 10 | 0.7 | 9.6 |
| 4 | toluene | 5 | VBC | 83 | 0.1 | 10.6 |
| 5 | THF | 10 | VBC | 83 | 0.9 | 10.1 |
| 6 | THF | 10 | MBDGA | 83 | 1.8 | 7.2 |
| 7 | THF | 20 | VBC | 83 | 1.2 | 10.8 |
| 8 | THF | 20 | VBC$^a$ | 83 | 2.2 | 11.7 |
| 9 | THF | 20 | VBC$^a$ | 83 | 0.5 | 9.8 |
| 10 | THF | 10 | VBC$^a$ | 83 | 0.3 | 10.7 |
| 11 | THF | 10 | VPM | 60 | 4.3 | 13.3 |
| 12 | THF | 5 | VPM | 60 | 6.3 | 12.9 |
| 13 | THF | 10 | MBDGA | 83 | 3.4 | 6.6 |
| 14 | THF | 10 | MBDGA | 83 | 6.4 | 7.1 |
| A | — | — | — | — | — | 5.2 |
| B | THF | 10 | none | — | 1.5 | 5.8 |
| C | THF | 21$^b$ | VBC | 83 | 0.4 | 6.3 |
| D | DMSO | 50$^c$ | VBC | 56 | 1.3 | 9.0 |

$^a$distilled.
$^b$potassium tert-butoxide.
$^c$sodium hydride.

Examples 15-21

Comparative Examples E-G

The grafted cords of Examples 8, 10, 11, and 12, and Comparative Examples B, C and D were treated by dipping into vinylpyridine latex diluted to various percent solids and suspending parallel to the bench top to air dry. Several samples were dipped a second time. The TGA results and H-pull adhesion values are shown in Table 3.

Comparative Examples H and I

Kevlar® 29 cords that are coated with a standard RFL formulation as described by Y. Iyengar, *J. Appl. Polym. Sci.*, 1978, 22, 801-812 typically give H-pull adhesion values of about 30 lbf. Several batches of RFL-coated cord and standard rubber stock were tested to confirm these values as shown in Table 3.

TABLE 3

| Example | Cord Example | Cord Treatment | VPL wt % | VPL dips | TGA wt % | H-Pull lbf |
|---|---|---|---|---|---|---|
| 15 | 8 | VBC | 15 | 1 | 8.6 | 21.3 |
| 16 | 8 | VBC | 15 | 2 | 15.3 | 31.3 |
| 17 | 10 | VBC | 25 | 1 | 17.5 | 39.6 |
| 18 | 11 | VPM | 15 | 1 | 15.5 | 28.9 |
| 19 | 11 | VPM | 15 | 2 | 22.2 | 26.1 |
| 20 | 12 | VPM | 15 | 1 | 14.7 | 26.6 |
| 21 | 12 | VPM | 15 | 2 | 20.2 | 29.5 |
| E | B | none | 15 | 1 | 15.3 | 10.3 |
| F | C | VBC | 25 | 1 | 14.7 | 13.0 |
| G | D | VBC | 25 | 1 | 17.9 | 21.5 |
| H | — | RFL | — | — | — | 28.9 |
| I | — | RFL | — | — | — | 34.5 |

Examples 22-26

Samples of the MBDGA-grafted cord from Example 13 were treated with solutions of either 0.3% 2-ethyl-4-methylimidazole in methanol, 6% 4-aminostyrene in 2-butanone containing 0.3% 2-ethyl-4-methylimidazole, or 20% 4-aminostyrene in 2-butanone. Some of the treated cords were then dipped in vinylpyridine latex diluted to 25% solids. The cords were suspended parallel to the bench top to air dry after each treatment. The TGA results and H-pull adhesion values are shown in Table 4.

TABLE 4

| Example | Cord Treatment | Solution wt % | VPL (25 wt %) | TGA wt % | H-Pull lbf |
|---|---|---|---|---|---|
| 22 | EMI-24 | 0.3 | yes | 24.6 | 13.3 |
| 23 | AS/EMI-24 | 6/0.3 | no | 7.4 | 11.6 |
| 24 | AS/EMI-24 | 6/0.3 | yes | 22.1 | 16.8 |
| 25 | AS | 20 | no | 7.3 | 10.4 |
| 26 | AS | 20 | yes | 23.5 | 17.0 |

Examples 27-33

Samples of the MBDGA-grafted cord of Example 14 were treated with solutions of either 10% 4-aminostyrene in water containing 10% ethanol and 0.5% 2-ethyl-4-methylimidazole or 20% 4-aminostyrene in water containing 20% ethanol and 1% 2-ethyl-4-methylimidazole. The treated cords were further heat-treated at 130° C. for 5 minutes and/or dipped in vinylpyridine latex diluted to 25% solids. The cords were suspended parallel to the bench top to air dry after each treatment. The TGA results and H-pull adhesion values are shown in Table 5.

TABLE 5

| Example | AS % | 130° C. Cure | VPL (25 wt %) | TGA wt % | H-Pull lbf |
|---|---|---|---|---|---|
| 27 | 10 | no | no | 2.6 | 9.7 |
| 28 | 10 | no | yes | 17.2 | 24.5 |
| 29 | 20 | no | no | 3.5 | 9.0 |
| 30 | 20 | no | yes | 14.2 | 21.5 |
| 31 | 10 | yes | no | 4.2 | 11.1 |
| 32 | 10 | yes | yes | 24.0 | 17.4 |
| 33 | 20 | yes | yes | 26.3 | 13.7 |

Example 34

Kevlar® pulp merge 1F361 (90 g, 56% solids) was dispersed in 3.5 L deionized water heated to 60° C. using a high-shear mixer (IKA Ultra-Turrax Model SD-45) to give a smooth slurry (1.4% solids). About 2200 mL of the slurry was redispersed with the high shear mixer and vacuum filtered to give a mass of wet pulp that was then washed with deionized water. The wet pulp was not compressed or aspirated to remove excess moisture. The wet pulp was broken into chunks and placed in a wide-mouth vacuum jar. The jar was placed in a So-Low ultra-low freezer (−40° C.) to freeze the wet pulp overnight. The jar was attached to a continuous freeze-dryer with a dry-ice cooled trap and placed under high vacuum (30 mTorr). The jar was placed in the freezer to keep the pulp frozen only while clearing the trap of moisture. The pulp slowly warmed to room temperature as the water finished subliming from the frozen mass. The pulp was finished by drying under high vacuum overnight to give 32 g. The specific surface area was 16.4 $m^2/g$ after a weight loss of 1.8%.

A portion of the freeze-dried Kevlar® pulp (1.5 g, 12.6 millimoles amide groups) was placed in a 200 mL round-bottom flask equipped with a large stirring bar and dried at 120° C. in a vacuum oven. The flask was transferred to the glove box and treated with anhydrous THF (75 mL). The pulp was treated with a 1M solution of $P_4tBu$ in hexane (1.3 mL, 10 mole %) to initially give it a rust-red color that faded to orange over about 1 hour. 4,4'-Methylene bis(N,N-diglycidylaniline) (2.7 g, 6.4 millimoles) was dissolved in THF (25 mL) and added to the pulp slurry. After stirring overnight, the slurry was diluted with THF (100 mL) and the pulp was collected by vacuum filtration. The orange pulp was quenched by washing twice with methanol then twice with deionized water while avoiding any compaction of the filter cake. The wet pulp was placed in a 250 mL round bottom flask and then in the ultra-low freezer (−40° C.) to freeze the wet pulp overnight. The flask was attached to a continuous freeze-dryer with a dry-ice cooled trap and placed under high vacuum. The pulp slowly warmed to room temperature as the water finished subliming from the frozen mass. The pulp was finished by drying under high vacuum overnight to give 1.74 g. The specific surface area was 15.4 $m^2/g$ after a weight loss of 4.6%. TGA showed a weight loss of 10.1 wt % between 200 and 435° C. due to the grafted epoxy groups. ATR IR showed a decrease in the absorbance at 3300 $cm^{-1}$ for amide NH groups, and increased absorbances at 2800-3000 $cm^{-1}$ for aliphatic groups and at 1612 and 1512 $cm^{-1}$ for aromatic groups relative to untreated pulp.

Example 35

Freeze-dried Kevlar® pulp (1.5 g, 12.6 millimoles amide groups) with a specific surface area of 18.4 $m^2/g$ was placed in a 200 mL round-bottom flask equipped with a large stirring bar and transferred to a nitrogen-purged glove box. The pulp was treated with anhydrous THF (100 mL) and stirred overnight. The solvent was decanted off and the pulp was retreated with fresh THF. The solvent was again decanted off then the pulp was treated with sufficient THF to give about 100 mL of slurry. The pulp was treated by stepwise addition of a 1M solution of $P_4tBu$ in hexane (1.9 mL, 15 mole %) to initially give it a rust-red color that faded to dark orange over about 1 hour. The solvent was decanted off the dark-orange pulp and treated with fresh THF (100 mL). 4-Vinylbenzyl chloride (0.9 mL, 6.4 millimoles) was added dropwise by pipet. After stirring about 2 hours, the color of the pulp had faded to a lighter orange. After stirring overnight, the color had faded to yellow. The pulp was collected by vacuum filtration and washed with THF, methanol, and then THF. The pulp was dried under vacuum to give 1.54 g. The specific surface area was 3.3 $m^2/g$ after a weight loss of 3.9%. TGA showed a weight loss of 4.0 wt % between 200 and 400° C. due to the grafted vinylbenzyl groups. ATR IR showed a decrease in the absorbance at 3300 $cm^{-1}$ for amide NH groups, and increased absorbances at 2800-3000 $cm^{-1}$ for aliphatic groups and at 1512 $cm^{-1}$ for aromatic groups relative to untreated pulp.

Example 36

Freeze-dried Kevlar® pulp (16 g, 130 millimoles amide groups) with a specific surface area of 17.3 $m^2/g$ was placed in a 3 L three-neck Morton flask and dried at 120° C. in a vacuum oven. The flask was equipped with a stainless steel stirring rod, gas-tight Teflon® stirrer bearing, septum, and reflux condenser with gas inlet while purging with nitrogen. Anhydrous THF (1 L) was transferred to the flask by cannula and stirred to partially disperse the pulp. Inside the glove box, a 1M solution of $P_4tBu$ in hexane (13 mL, 10 mole %) was added to anhydrous THF (1 L), which was then added by cannula to the Morton flask to turn the pulp a light orange color. The mixture was heated to a mild reflux during which the color intensified to a darker orange. After stirring for about 1 hour, the orange pulp was finely dispersed in the solution and the mixture was cooled to room temperature. Inside the glove box, 4-vinylbenzyl chloride (9 mL, 64 millimoles) was added to anhydrous THF (100 mL), which was then added by cannula to the Morton flask. The pulp returned to a yellow color with stirring, which was continued overnight. The solvent was removed from the flask using a glass-fritted tube connected to a vacuum filter flask. The pulp was washed three times with methanol (1200 mL) then three times with deionized water (1200 mL). A portion of the wet pulp was dried under high vacuum to determine percent solids of 25.8%. TGA showed a weight loss of 2.6 wt % between 200 and 400° C. due to the grafted vinylbenzyl groups. ATR IR showed a decrease in the absorbance at 3300 $cm^{-1}$ for amide NH groups relative to untreated pulp.

Example 37

Freeze-dried Kevlar® pulp (16.2 g, 130 millimoles amide groups) with a specific surface area of 14.3 $m^2/g$ was placed in a 3 L three-neck Morton flask and dried at 120° C. in a vacuum oven. The flask was equipped with a stainless steel stirring rod, gas-tight Teflon® stirrer bearing, septum, and reflux condenser with gas inlet while purging with nitrogen.

Anhydrous THF (1 L) was transferred to the flask by cannula and stirred to partially disperse the pulp. Inside the glove box, a 1M solution of $P_4tBu$ in hexane (13 mL, 10 mole %) was added to anhydrous THF (1 L), which was then added by cannula to the Morton flask. The pulp became rust-red in color in the immediate vicinity of the added solution, but the color faded to a light orange with stirring. The mixture was heated to a mild reflux during which the color intensified to a darker orange. After stirring for about 3 hour, the orange pulp was finely dispersed in the solution and the mixture was cooled to room temperature. Inside the glove box, 4-vinylbenzyl chloride (9 mL, 64 millimoles) was added to anhydrous THF (100 mL), which was then added by cannula to the Morton flask. The pulp returned to a yellow color as it was stirred overnight. The mixture was quenched with methanol (100 mL) then the solvent was removed from the flask using a glass-fritted tube connected to a vacuum filter flask. The pulp was washed three times with methanol (1200 mL) then three times with deionized water (1200 mL). A portion of the wet pulp was dried under high vacuum to determine percent solids of 27.0%. TGA showed a weight loss of 2.4 wt % between 200 and 400° C. due to the grafted vinylbenzyl groups. ATR IR showed a decrease in the absorbance at 3300 $cm^{-1}$ for amide NH groups relative to untreated pulp.

Example 38

Freeze-dried Kevlar® pulp (16 g, 130 millimoles amide groups) with a specific surface area of 14.0 $m^2/g$ was placed in a 3 L three-neck Morton flask and dried at 120° C. in a vacuum oven. The flask was equipped with a stainless steel stirring rod, gas-tight Teflon® stirrer bearing, septum, and reflux condenser with gas inlet while purging with nitrogen. Anhydrous THF (1 L) was transferred to the flask by cannula and stirred to partially disperse the pulp. Inside the glove box, a 1M solution of $P_4tBu$ in hexane (13 mL, 10 mole %) was added to anhydrous THF (1 L), which was then added by cannula to the Morton flask to turn the pulp an orange color. The mixture was heated to a mild reflux during which the color intensified to a darker orange. After stirring for about 2 hour, the orange pulp was finely dispersed in the solution and the mixture was cooled to room temperature. Inside the glove box, 4,4'-methylene bis(N,N-diglycidylaniline) (11 g, 26 millimoles) was dissolved in anhydrous THF (100 mL), which was then added by cannula to the Morton flask. The orange pulp became less intense in color as it was stirred overnight. The mixture was quenched with methanol (100 mL) then vacuum filtered to collect the yellow pulp. The pulp was washed three times with methanol (1200 mL) then three times with deionized water (1200 mL). A portion of the wet pulp was dried under high vacuum to determine percent solids of 24.6%. TGA showed a weight loss of 4.0 wt % between 200 and 500° C. due to the grafted epoxy groups. ATR IR showed a decrease in the absorbance at 3300 $cm^{-1}$ for amide NH groups relative to untreated pulp.

Example 39

Freeze-dried Kevlar® pulp (16 g, 130 millimoles amide groups) with a specific surface area of 14.0 $m^2/g$ was placed in a 3 L three-neck Morton flask and dried at 120° C. in a vacuum oven. The flask was equipped with a stainless steel stirring rod, gas-tight Teflon® stirrer bearing, septum, and reflux condenser with gas inlet while purging with nitrogen. Anhydrous THF (1 L) was transferred to the flask by cannula and stirred to partially disperse the pulp. Inside the glove box, a 1M solution of $P_4tBu$ in hexane (13 mL, 10 mole %) was added to anhydrous THF (1 L), which was then added by cannula to the Morton flask to give an orange color. The mixture was heated to a mild reflux during which the color intensified to a darker orange. After stirring for about 4 hours, the orange pulp was finely dispersed in the solution and the mixture was cooled to room temperature. Inside the glove box, 4,4'-methylene bis(N,N-diglycidylaniline) (11 g, 26 millimoles) was dissolved in anhydrous THF (100 mL), which was then added by cannula to the Morton flask. The pulp became yellow-orange color as it was stirred overnight. The mixture was quenched with methanol (200 mL) then vacuum filtered to collect the yellow pulp. The pulp was washed three times with methanol (1400 mL) then three times with deionized water (1400 mL). A portion of the wet pulp was dried under high vacuum to determine percent solids of 24.1%. TGA showed a weight loss of 4.1 wt % between 200 and 500° C. due to the grafted epoxy groups. ATR IR showed a decrease in the absorbance at 3300 $cm^{-1}$ for amide NH groups relative to untreated pulp.

Example 40

Freeze-dried Kevlar® pulp (16 g, 130 millimoles amide groups) with a specific surface area of 16.8 $m^2/g$ was placed in a 3 L three-neck Morton flask and dried at 120° C. in a vacuum oven. The flask was equipped with a stainless steel stirring rod, gas-tight Teflon® stirrer bearing, septum, and reflux condenser with gas inlet while purging with nitrogen. Anhydrous THF (1 L) was transferred to the flask by cannula and stirred to partially disperse the pulp. Inside the glove box, a 1M solution of $P_4tBu$ in hexane (6.5 mL, 5 mole %) was added to anhydrous THF (1 L), which was then added by cannula to the Morton flask to give an orange-colored pulp. The mixture was heated to a mild reflux. After stirring for about 4 hours, the orange pulp was finely dispersed in the solution and the mixture was cooled to room temperature. Inside the glove box, N-(4-vinylphenyl)maleimide (2.6 g, 13 millimoles) was dissolved in anhydrous THF (100 mL), which was then added by cannula to the Morton flask. The pulp became yellow-orange color as it was stirred overnight. The mixture was quenched with methanol (200 mL) then vacuum filtered to collect the yellow pulp. The pulp was washed three times with methanol (1400 mL) then three times with deionized water (1400 mL). A portion of the wet pulp was dried under high vacuum to determine percent solids of 26.4%. TGA showed a weight loss of 2.7 wt % between 200 and 475° C. due to the grafted polymerization of the maleimide groups. ATR IR showed an absorbance at 1707 $cm^{-1}$ for the grafted imide carbonyl groups.

Comparative Example J

Kevlar® pulp 1F361 (40 g, 50% solids) was dispersed in water (1000 g) using a laboratory blender to give a homogeneous slurry. Alcogum® 6940 (10 g, 11% solids), Alcogum® SL 70 (2.2 g, 15% solids), Aquamix® 549 (4.1 g, 15% solids), and Aquamix® 125 (4.3 g, 14.5% solids) were added to the blender and dispersed into the slurry. Natural rubber latex (108 g, 62% solids) was added to the blender and dispersed into the slurry. The slurry was poured into an open container and the blender jar was rinsed with water to collect all of the slurry. The latex was coagulated by adding an aqueous solution containing calcium chloride (26 wt %) and acetic acid (5.2 wt %) with gentle stirring until the pH was between 5.8 and 5.2. The coagulated mass was collected and pressed to remove as much of the aqueous phase as possible. The mass was then dried overnight at 70° C. in a vacuum oven under nitrogen purge to give a natural rubber masterbatch containing 23% pulp.

A rubber compound containing 5 phr pulp was prepared by adding the following materials to a C. W. Brabender Prep-Mixer® equipped with cam mixing blades: natural rubber (192.5 g), the masterbatch (50.25 g), stearic acid (6.94 g, 3 phr), zinc oxide (6.94 g, 3 phr), rubbermaker's sulfur (3.70 g, 1.6 phr), Amax® OBTS (1.85 g, 0.8 phr), DPG (0.92 g, 0.4 phr), Santoflex® 6PPD (4.62 g, 2 phr), and AgeRite® Resin D (2.31 g, 1 phr). The compound was mixed at 80-95° C. for 25-30 minutes at 75-100 rpm, then removed from the mixing chamber and blades. The compound was mixed further and homogenized using an EEMCO 2 roll laboratory mill with 6 inch by 12 inch wide rolls. The final compound was sheeted to a thickness of 2.0-2.2 mm. Two 4 inch by 6 inch plaques were cut from the milled sheet in the machine direction, and another two plaques were cut in the cross-machine direction. The plaques were compression molded at 160° C. to cure the natural rubber.

Dumbell tensile bars were cut from the cured plaques. The tensile properties are shown in Table 6.

Example 41

The procedure of Comparative Example J was modified to prepare a natural rubber masterbatch containing 22% of the MBDGA-grafted pulp of Example 22 (15 g) and 37% of vinylpyridine terpolymer by adjusting the required quantities of the other materials and adding GenTac® FS vinylpyridine latex (61 g, 41% solids) before the other additives and the natural rubber latex. The rubber compound was then made and tested as described in Comparative Example J. The tensile properties are shown in Table 6.

TABLE 6

| | Example | | | |
| | 41 | | J | |
| Test Direction | MD | XD | MD | XD |
|---|---|---|---|---|
| Stress, 10% Strain (MPa) | 0.90 | 0.72 | 0.83 | 0.70 |
| Stress, 25% Strain (MPa) | 2.51 | 1.62 | 2.06 | 1.64 |
| Stress, 50% Strain (MPa) | 4.74 | 2.67 | 3.91 | 2.86 |
| Stress, 100% Strain (MPa) | 5.45 | 3.67 | 5.14 | 3.99 |
| Stress, 200% Strain (MPa) | 6.15 | 4.80 | 6.11 | 5.14 |
| Stress, 300% Strain (MPa) | 7.60 | 6.37 | 7.89 | 6.72 |
| Strain at Break, % | 306 | 395 | 392 | 475 |

What is claimed is:

1. A method of making a fiber comprised of poly(p-phenylene terephthalamide) having monomer groups grafted onto the fiber surface, the method comprising the steps of:
   (i) providing a fiber of poly(p-phenylene terephthalamide) that has been dried to remove adsorbed moisture,
   (ii) treating the fiber, in a non-polar solvent that will not dissolve the fiber, with a phosphazene base that exhibits a pKa in dimethylsulfoxide of at least 21 so as to generate anions at the amide sites on the surface of the poly(p-phenylene terephthalamide) fiber, and
   (iii) grafting a monomer onto the anion sites so as to introduce reactive functional groups onto the surface of the poly(p-phenylene terephthalamide) fiber.

2. The method of claim 1 wherein the phosphazene base exhibits a pKa in dimethylsulfoxide of at least 30.

3. The method of claim 1 wherein the solvent is toluene or tetrahydrofuran.

4. The method of claim 1 wherein the phosphazene base is an iminophosphorane, phosphazophosphazene, aminophosphazene, guanidinophosphazene, or phosphatrane.

5. The method of claim 1 wherein the phosphazene base is tertiary-butyl-$P_4$-phosphazene.

6. The method of claim 1 wherein the monomer is an allyl halide, a substituted benzyl chloride, a substituted N-phenylmaleimide or a substituted epoxy.

7. The method of claim 6 wherein the substituted benzyl chloride is 4-vinylbenzyl chloride or 3-vinylbenzyl chloride, the substituted N-phenymaleimide is N-(4-vinylphenyl)maleimide, and the substituted epoxy is 4,4'-methylene-bis(N,N-diglycidylaniline), epichlorohydrin, or epibromohydrin.

8. A method of making a fiber comprised of poly(p-phenylene terephthalamide) having monomer groups grafted onto the fiber surface, the method comprising the steps of:
   (i) providing a fiber of poly(p-phenylene terephthalamide) that has been dried to remove adsorbed moisture,
   (ii) treating the fiber, in a non-polar solvent that will not dissolve the fiber, with a phosphazene base that exhibits a pKa in dimethylsulfoxide of at least 21 so as to generate anions at the amide sites on the surface of the poly(p-phenylene terephthalamide) fiber,
   (iii) grafting a monomer onto the anion sites so as to introduce reactive functional groups onto the surface of the poly(p-phenylene terephthalamide) fiber, and
   (iv) washing the grafted fiber of step (iii) with a protic solvent to extract any residual base compounds and grafting agents that are unbound to the surface of the fibers.

9. A method of making a fiber comprised of poly(p-phenylene terephthalamide) having monomer groups grafted onto the fiber surface, the method comprising the steps of:
   (i) providing a fiber of poly(p-phenylene terephthalamide) that has been dried to remove adsorbed moisture,
   (ii) treating the fiber, in a non-polar solvent that will not dissolve the fiber, with a phosphazene base that exhibits a pKa in dimethylsulfoxide of at least 21 so as to generate anions at the amide sites on the surface of the poly(p-phenylene terephthalamide) fiber,
   (iii) washing the base-activated fiber with an aprotic solvent to eliminate excess base compounds,
   (iv) grafting a monomer onto the anion sites so as to introduce reactive functional groups onto the surface of the poly(p-phenylene terephthalamide) fiber, and
   (v) washing the grafted fiber of step (iv) with a protic solvent to extract any residual base compounds and grafting agents that are unbound to the surface of the fibers.

10. A continuous filament yarn, cord, spun staple yarn, nonwoven fabric, floc, pulp or chopped strand comprising fiber treated by the method of claim 1, 8 or 9.

11. A fiber-reinforced composite comprising fiber treated by the method of claim 1, 8 or 9.

12. A fiber-reinforced rubber article comprising fiber treated by the method of claim 1, 8 or 9.

13. A dipped cord suitable for use in a rubber compound comprising fiber treated by the method of claim 1, 8 or 9 coated with a styrene-butadiene-vinylpyridine rubber latex.

14. A fibrous pulp comprising fiber treated by the method of claim 1, 8 or 9.

* * * * *